United States Patent [19]

Okudaira

[11] Patent Number: 4,523,814

[45] Date of Patent: Jun. 18, 1985

[54] ZOOM LENS

[75] Inventor: Sadao Okudaira, Tokyo, Japan

[73] Assignee: Asahi Kogaku Kogyo Kabushiki Kaisha, Tokyo, Japan

[21] Appl. No.: 506,266

[22] Filed: Jun. 21, 1983

[30] Foreign Application Priority Data

Jun. 23, 1982 [JP] Japan ................................ 57-108168
Mar. 9, 1983 [JP] Japan ................................ 58-38625

[51] Int. Cl.[3] ......................... G02B 9/64; G02B 15/18
[52] U.S. Cl. ................................................ 350/427
[58] Field of Search ........................................ 350/427

[56] References Cited

U.S. PATENT DOCUMENTS 4,299,454 11/1981 Betensky ............................ 350/427
4,359,270 11/1982 Okudaira ............................ 350/427

*Primary Examiner*—John K. Corbin
*Assistant Examiner*—Rebecca D. Gass
*Attorney, Agent, or Firm*—Sughrue, Mion, Zinn, Macpeak & Seas

[57] ABSTRACT

A zoom lens comprising, in order from the object, a first lens group having a positive refractive power, a second lens group having a negative refractive power, a third lens group having a positive refractive power and a fourth lens group having a positive refractive power. The first through fourth lens groups are independently moved in an axial direction to vary the overall focal length. The zoom lens meets the following conditions:

(1) $0.25F_W<F_I<0.45F_W$ (2) $1.65<n_{IV}$ (3) $1.2f_{BW}<f_{BT}<0.95f_{BM}$ where $F_W$ is the overall focal length at the minimum end, $F_I$ is the focal length of the first lens group, $n_{IV}$ is the average refractive index, at d-line, of the lens elements constituting the fourth lens group, $f_{BW}$ and $f_{BT}$ are the backfocuses at the minimum and maximum ends of the overall focal length, respectively, and $F_{BM}$ is the backfocus at the intermediate end of the overall focal length.

11 Claims, 25 Drawing Figures r1 r2 r3 r4 r5 r6 r7 r8 r9 r10 r11 r12 r13 r14 r15 r16 r17 r18 r19 r20 r21 r22 r23 r24 r25 r26 r27 r28 r29 r30 r31
d1 d2 d3 d4 d5 d6 d7 d8 d9 d10 d11 d12 d13 d14 d15 d16 d17 d18 d19 d20 d21 d22 d23 d24 d25 d26 d27 d28 d29 d30

ZOOM LENS

BACKGROUND OF THE INVENTION

The present invention relates to a zoom lens with a highly variable power covering a wide-angle to telephoto range for use on 35 mm single-lens reflux cameras.

With the progress and development of zoom lens designing technology, zoom lenses have found widespread use as interchangeable lenses on 35 mm single-lens reflux cameras.

Wide-angle zoom lenses, standard zoom lenses, and telephoto zoom lenses are widely used today. To meet user's demands, in recent years there have been increasing numbers of zoom lenses including wide-angle to semi-telephoto capabilities and semi-wide-angle to telephoto capabilities. However, only a few zoom lenses are known which include a wide-angle capability with a covering angle of about 77° to a telephoto capability with a covering angle of about 18° and which are of high performance and compact for portability. Highly variable power zoom lenses which are compact and relatively high in performance, including wide-angle to telephoto capabilities, are also known for use on single-lens reflux cameras. Such zoom lenses achieve focusing by moving the overall lens system to prevent the diameter of a front lens from becoming increased due to ordinary focusing by a front lens group, thus acting as a varifocal lens. Alternatively, a varying focusing point due to zooming caused by focusing by other optical systems than the front lens group is corrected by a complicated mechanism, resulting in difficulty in the lens manufacture.

For example, U.S. Pat. No. 4,299,454 issued on Nov. 10, 1981 discloses a wide angle to long focus zoom lens, but has the following disadvantages.

The comparisons between the zoom lens according to the present invention and the zoom lens according to the disclosure of U.S. Pat. No. 4,299,454 will be made in terms of 35 mm SLR cameras.

(a) In the zoom lens according to U.S. Pat. No. 4,299,454 various aberrations would not be well compensated for. In particular, a spherical aberration is represented by approximately 1 to 3 mm at the telephoto end. According to the present invention, spherical aberration is represented by approximately 0.2 to 0.3 mm at the telephoto end. This distinction means that the lens system according to U.S. Pat. No. 4,299,454 would be put into practical use with great difficulty.

(b) The zoom lens according to U.S. Pat. No. 4,299,454 would be large in physical size beyond such a limit that it is acceptable as an interchangeable lens for SLR cameras in the market. More specifically, a diameter of the front lens of the zoom lens according to U.S. Pat. No. 4,299,454 ranges approximately from 75 to 80 mm. On the other hand, according to the present invention, a diameter of the front lens of the zoom lens is approximately 65 mm, which would easily be acceptable as an interchangeable lens for practical use.

(c) In the zoom lens according to U.S. Pat. No. 4,299,454, in spite that the front lens diameter is large as set forth in the item (b) above, an amount of marginal light is very small or represented by zero in some examples described in U.S. Pat. No. 4,299,454. Even if a thickness of an edge portion of each lens element would be made possibly thin while keeping the 35 mm camera image field size at 24×36 mm, the amount of marginal light would be still insufficient according to the disclosure of U.S. Pat. No. 4,299,454. This means that it would be difficult to put the zoom lens according to U.S. Pat. No. 4,299,454 into practical use.

(d) For the following reasons, in the zoom lens according to U.S. Pat. No. 4,299,454, it would be impossible to carry out a so-called front-lens-moving focusing and therefore, the lens system thereof must be of the overall-lens-moving focusing type, which has a serious disadvantage for the zoom lens. On the other hand, according to the present invention, the so-called front-lens-moving focusing may readily be achieved to enable practical short-distance focusing.

As described above, the zoom lens system disclosed in U.S. Pat. No. 4,299,454 may achieve the zooming but is difficult to realize.

SUMMARY OF THE INVENTION

The present invention relates to a zoom lens which meets the requirements for high performance and compactness and at the same time is as capable of focusing through movement of a front lens group as well known zoom lenses.

DETAILED DESCRIPTION OF THE PREFERRED EMBODIMENTS

Figure 1:
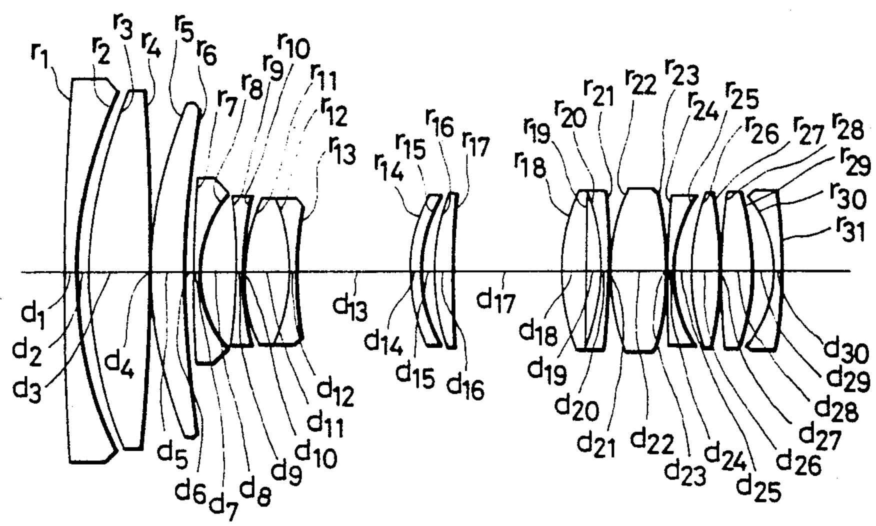
FIG. 1 is a view showing a lens arrangement according to Example 1 of the invention.
Figure 2:
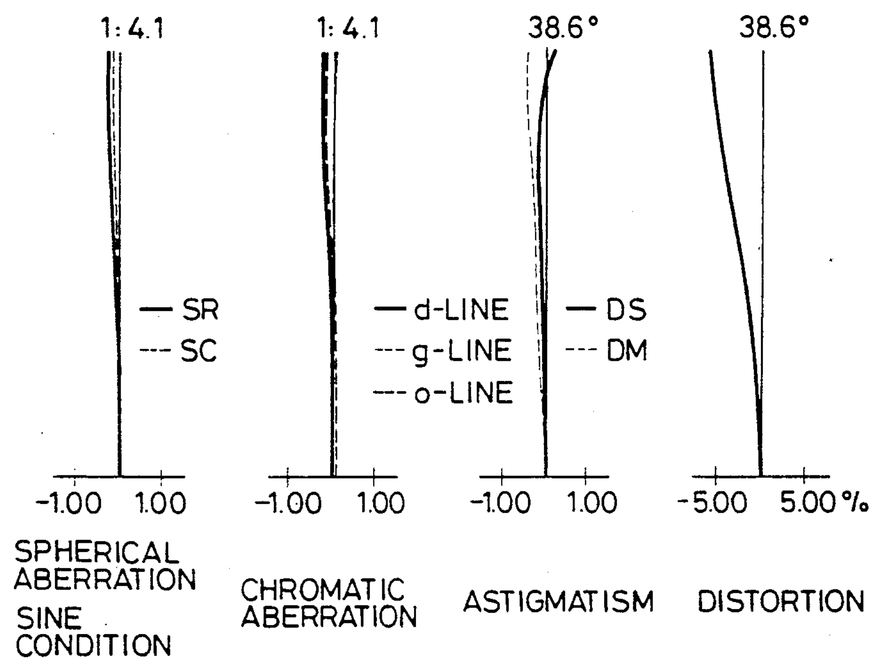
FIGS. 2 through 5 are diagrams showing aberrations of Example 1, FIG. 2 being illustrative of those at a shortest focal length, FIG. 3 at a first intermediate focal length, FIG. 4 at a second intermediate focal length, and FIG. 5 at a longest focal length.
Figure 3:
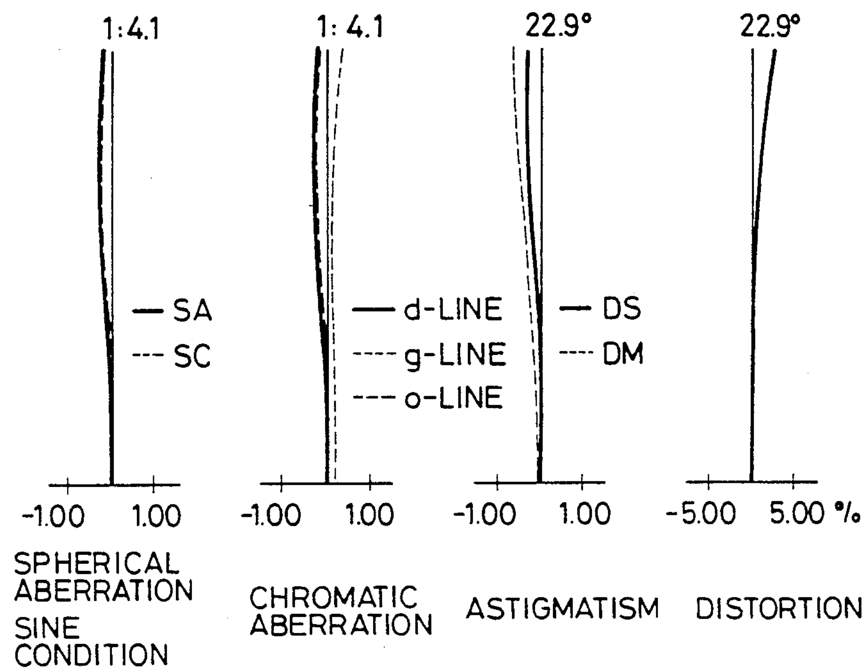
Figure 4:
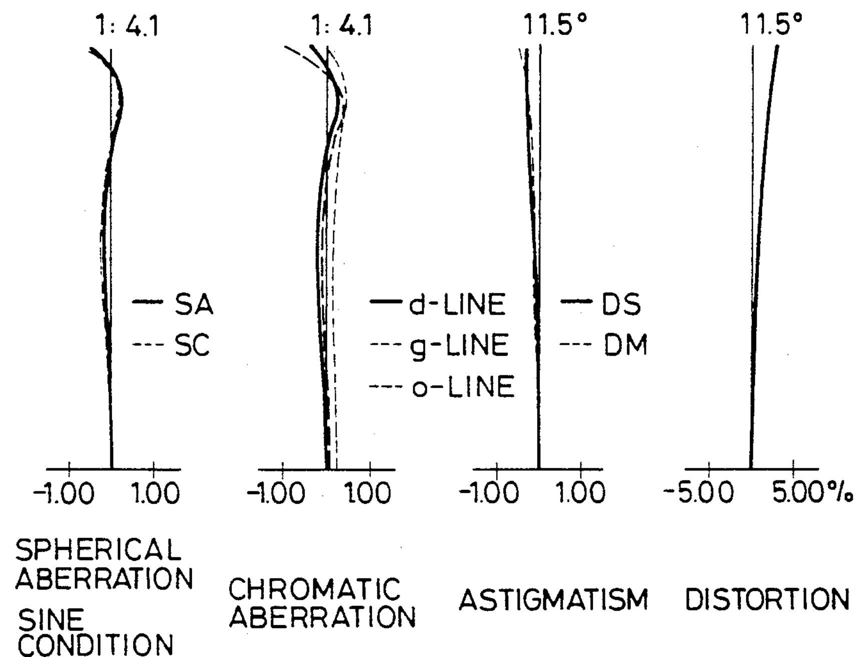
Figure 5:
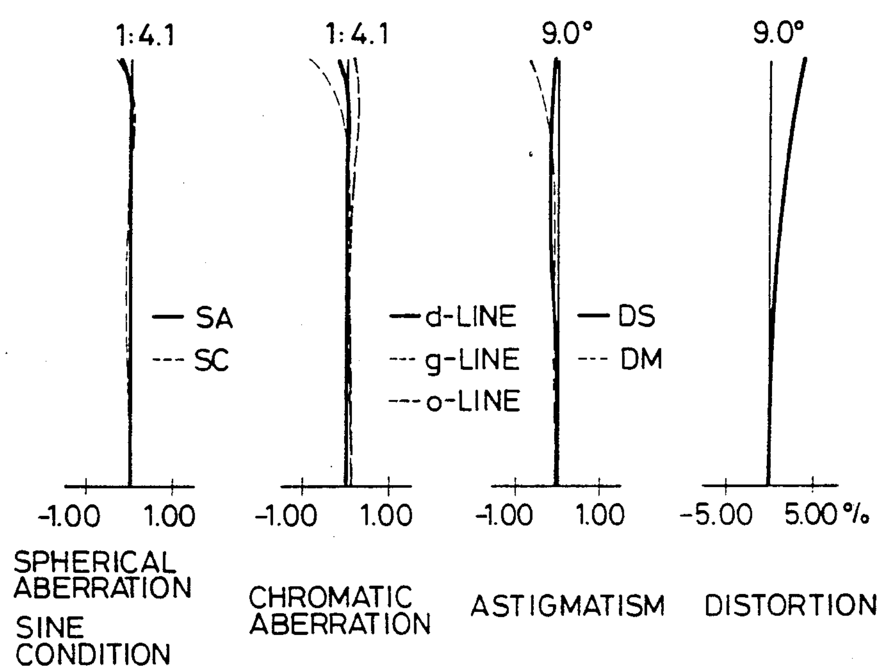
Figure 6:
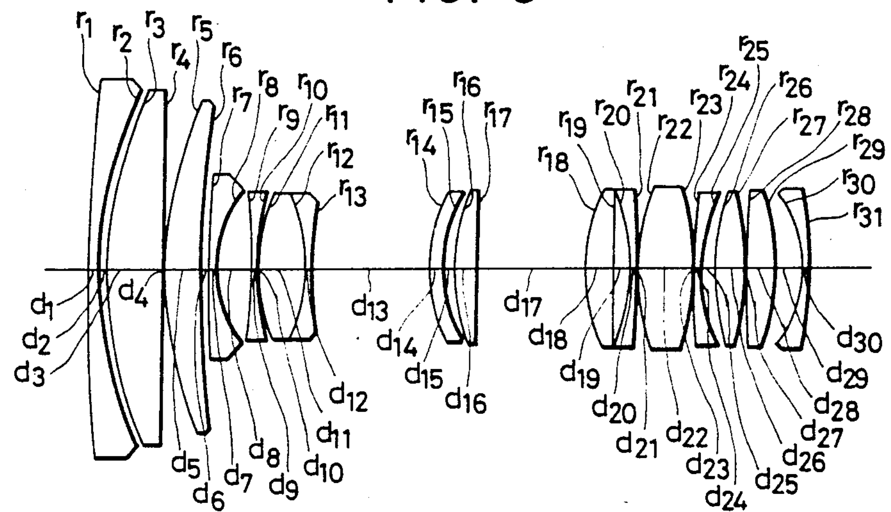
FIG. 6 is a view showing a lens arrangement according to Example 2 of the invention.
Figure 7:
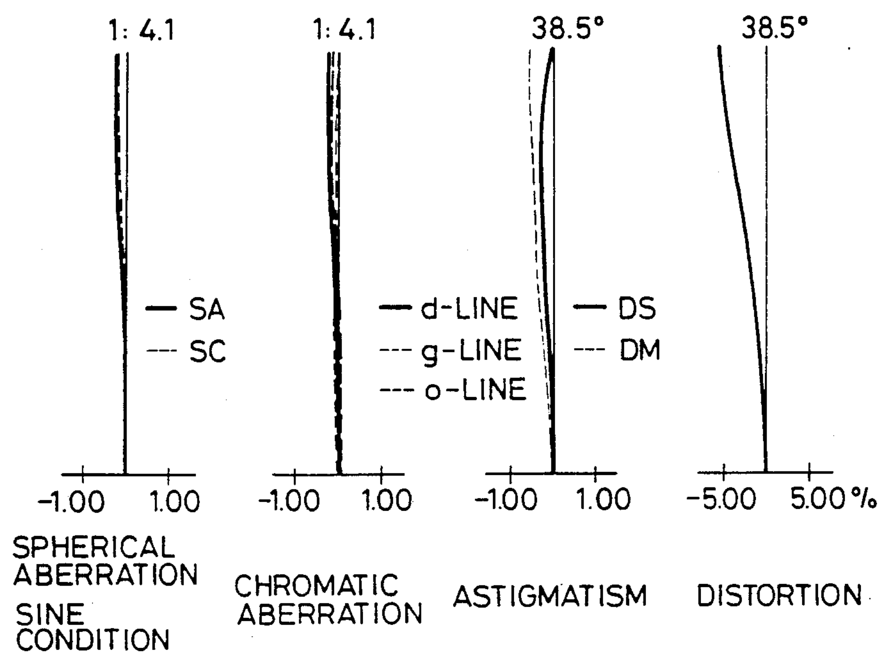
FIGS. 7 through 10 are diagrams showing aberrations of Example 2, FIG. 7 being illustrative of those at a shortest focal length, FIG. 8 at a first intermediate focal length, FIG. 9 at a second intermediate focal length, and FIG. 10 at a longest focal length.
Figure 8:
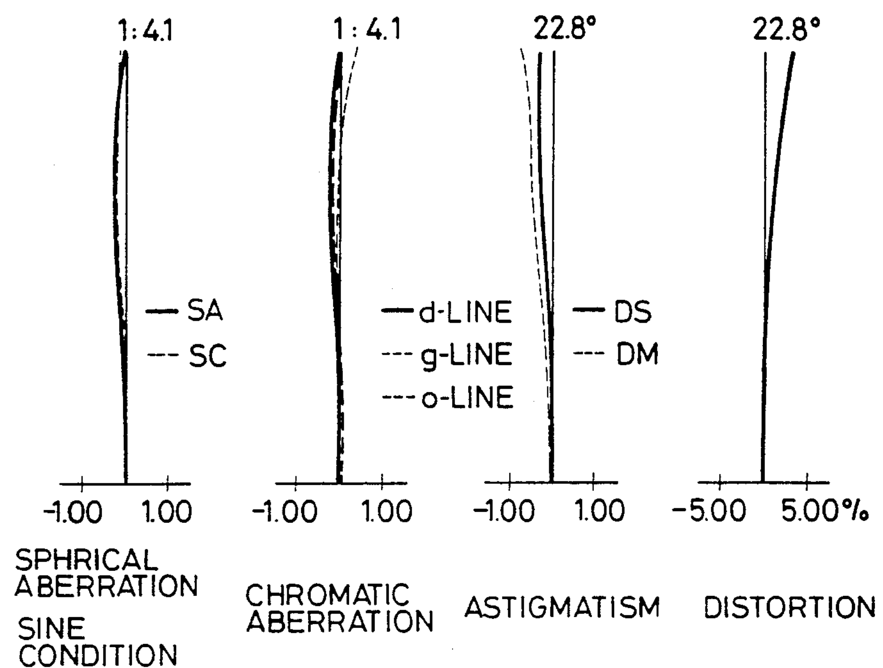
Figure 9:
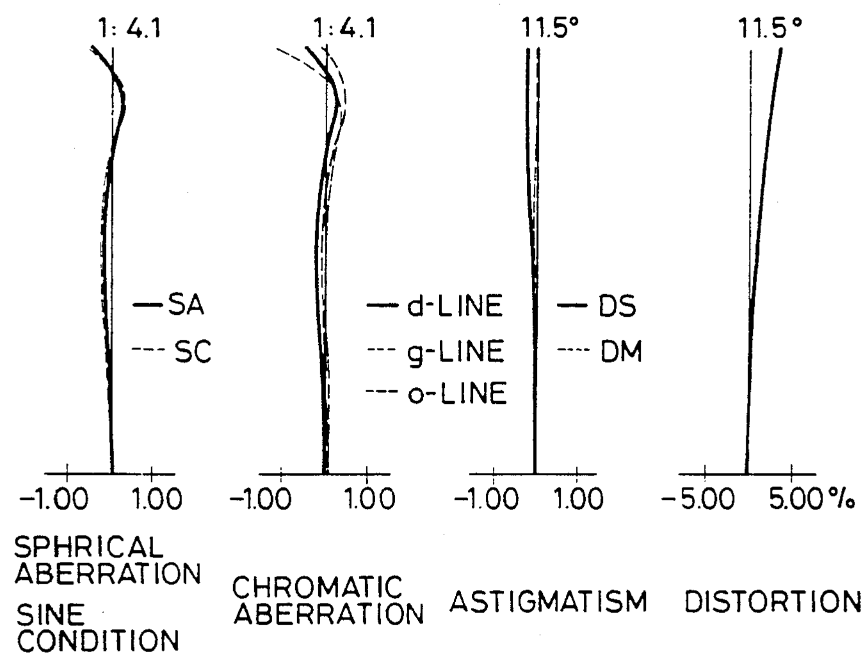
Figure 10:
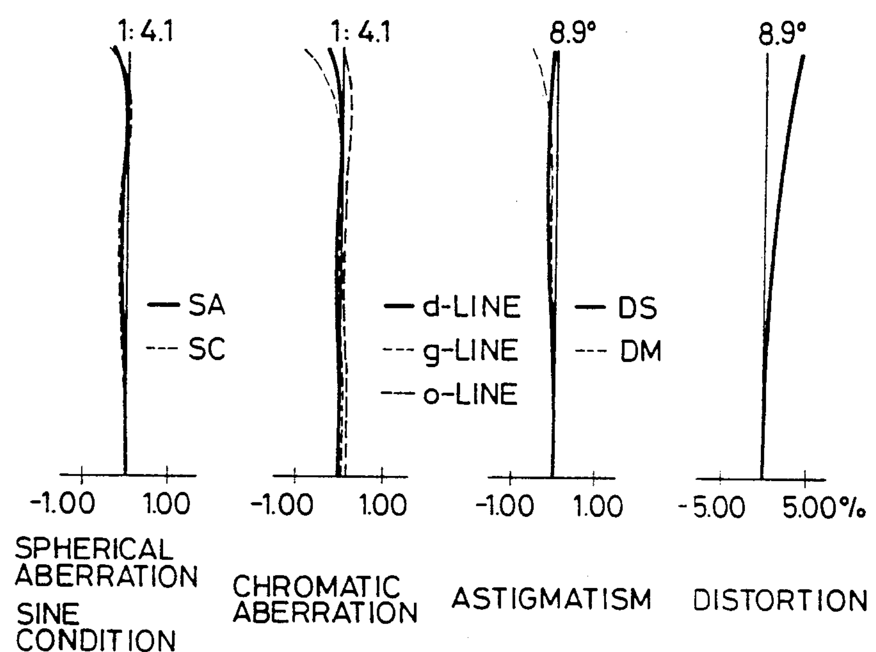
Figure 11:
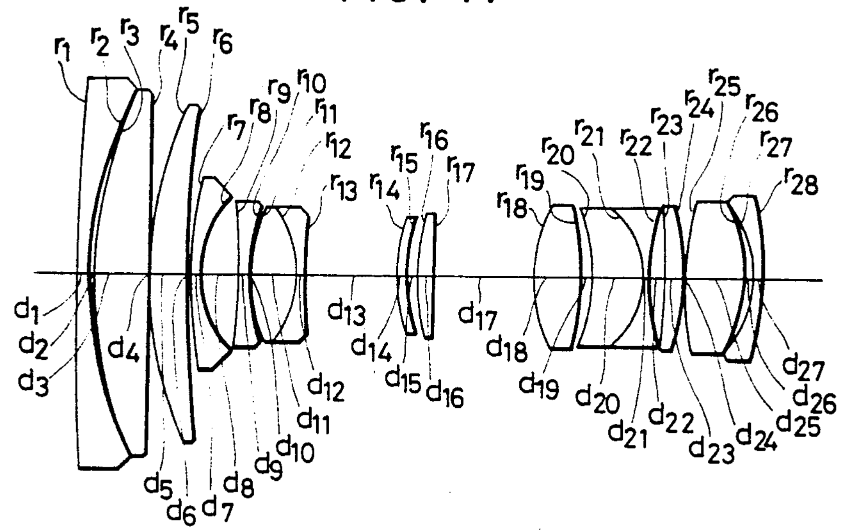
FIG. 11 is a view showing a lens arrangement according to Example 3 of the invention.
Figure 12:
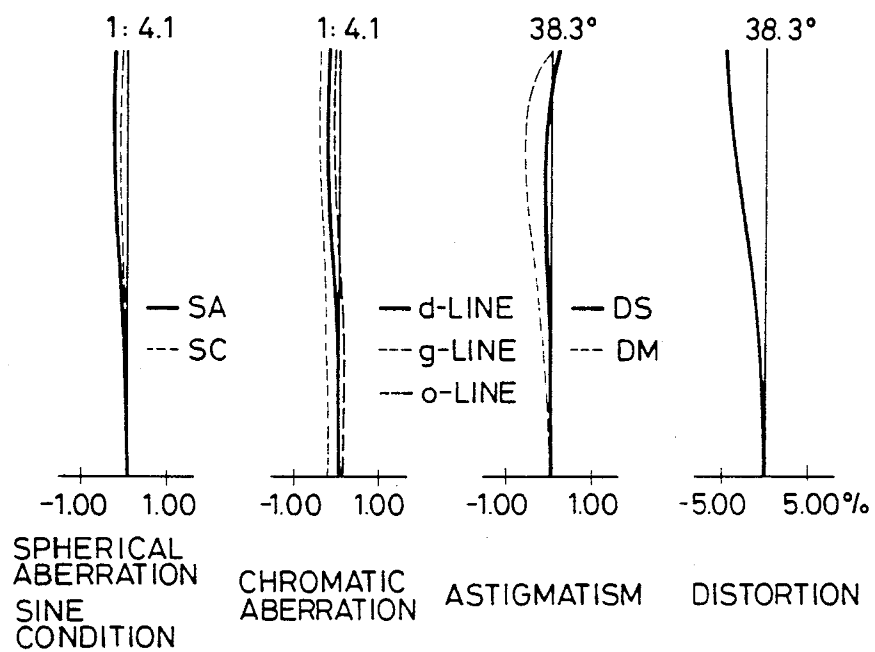
FIGS. 12 through 15 are diagrams showing aberrations of Example 3, FIG. 12 being illustrative of those at a shortest focal length, FIG. 13 at a first intermediate focal length, FIG. 14 at a second intermediate focal length, and FIG. 15 at a longest focal length.
Figure 13:
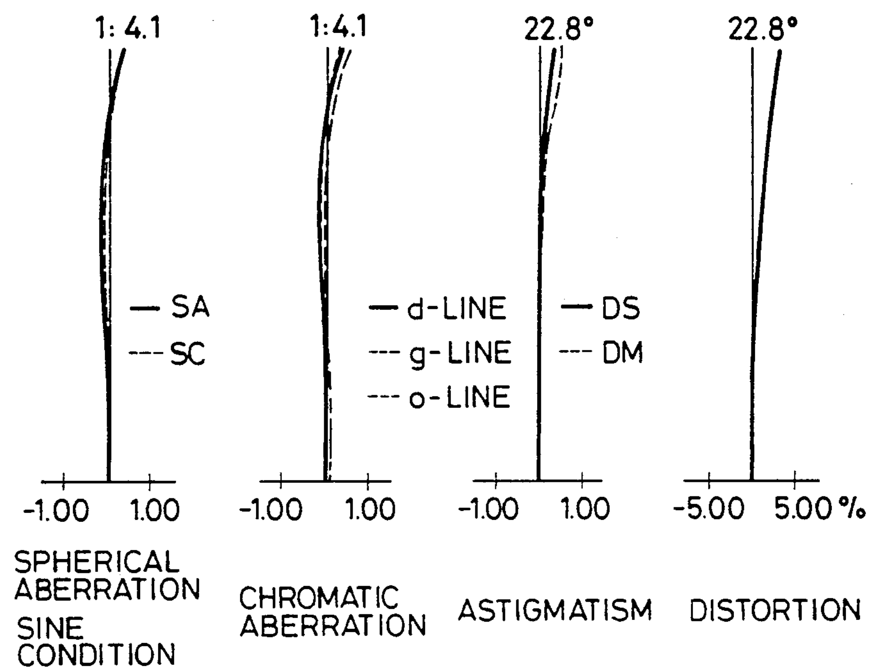
Figure 14:
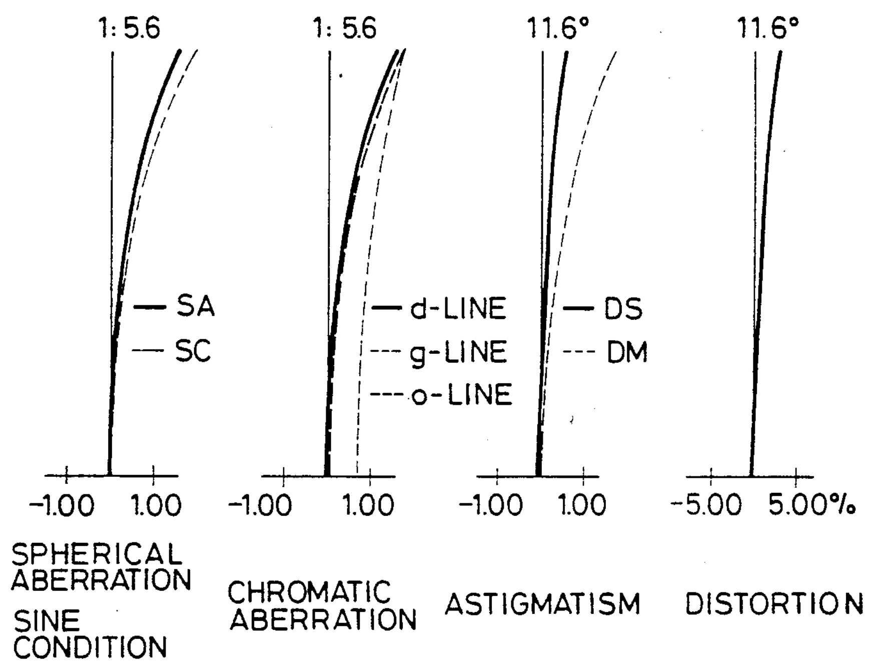
Figure 15:
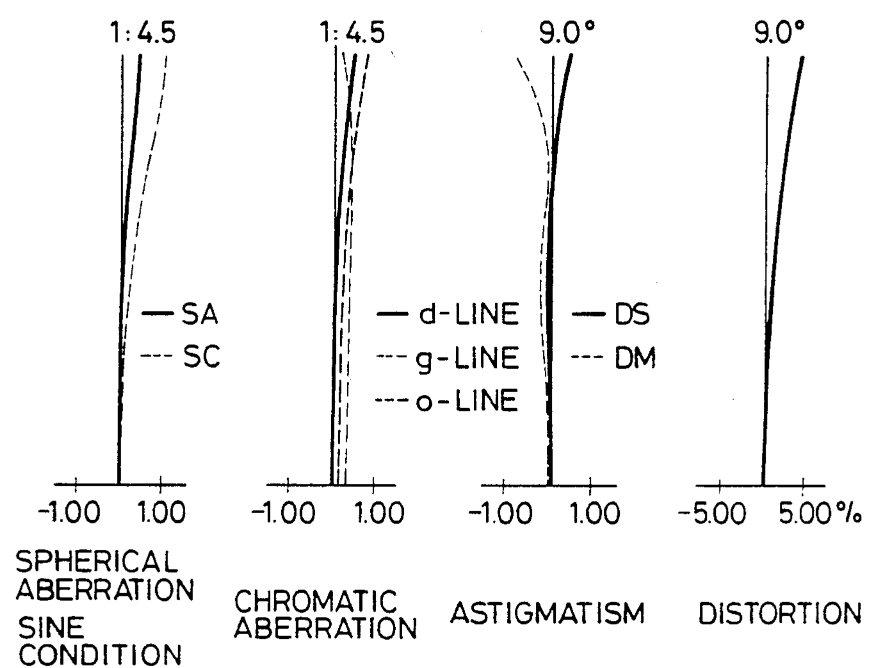
Figure 16:
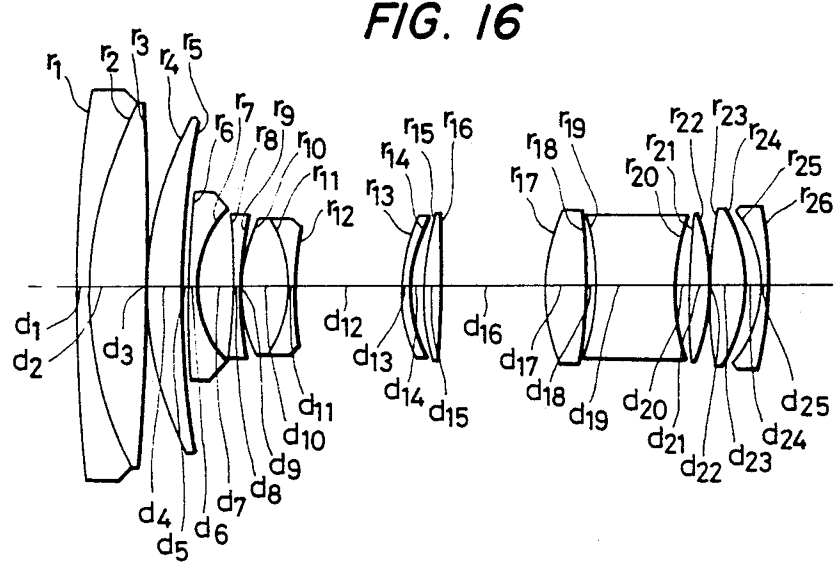
FIG. 16 is a view showing a lens arrangement according to Example 4 of the invention.
Figure 17:
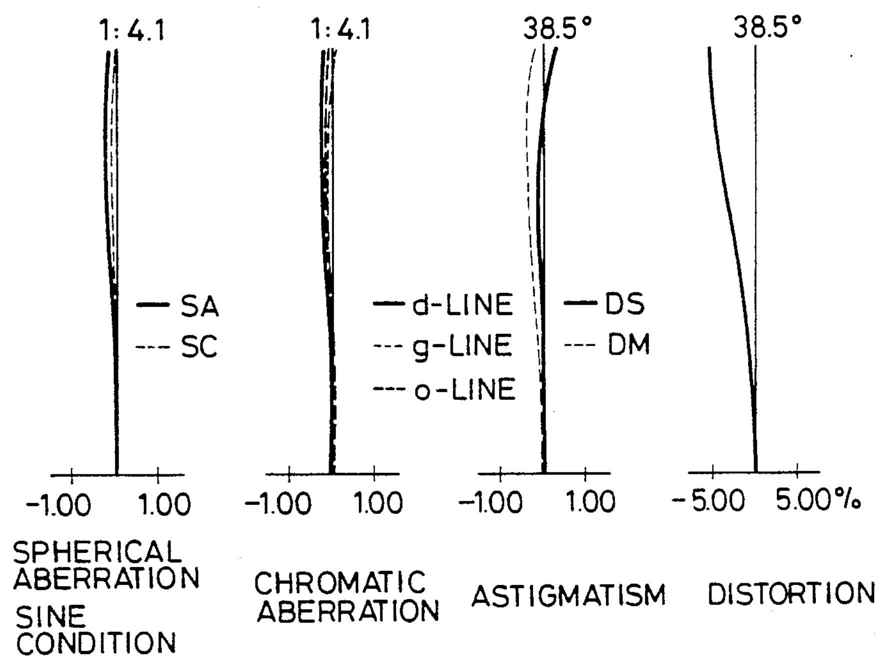
FIGS. 17 through 20 are diagrams showing aberrations of Example 4, FIG. 17 being illustrative of those at a shortest focal length, FIG. 18 at a first intermediate focal length, FIG. 19 at a second intermediate focal length and FIG. 20 at a longest focal length.
Figure 18:
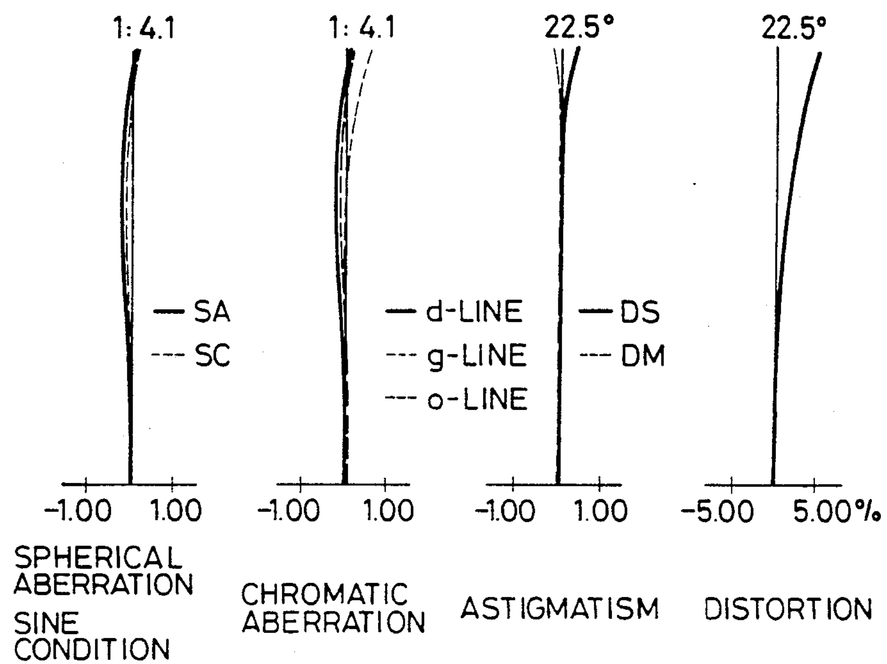
Figure 19:
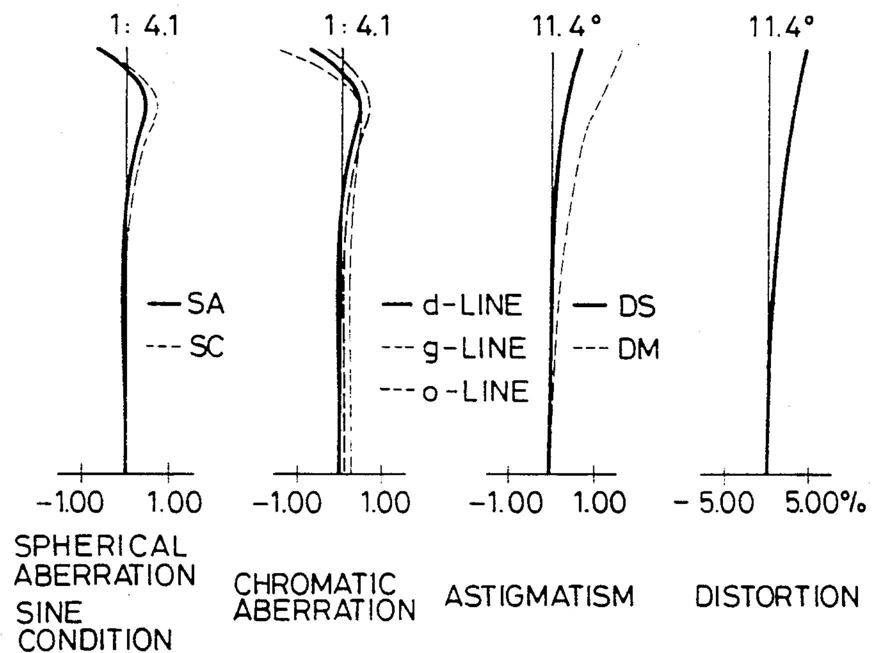
Figure 20:
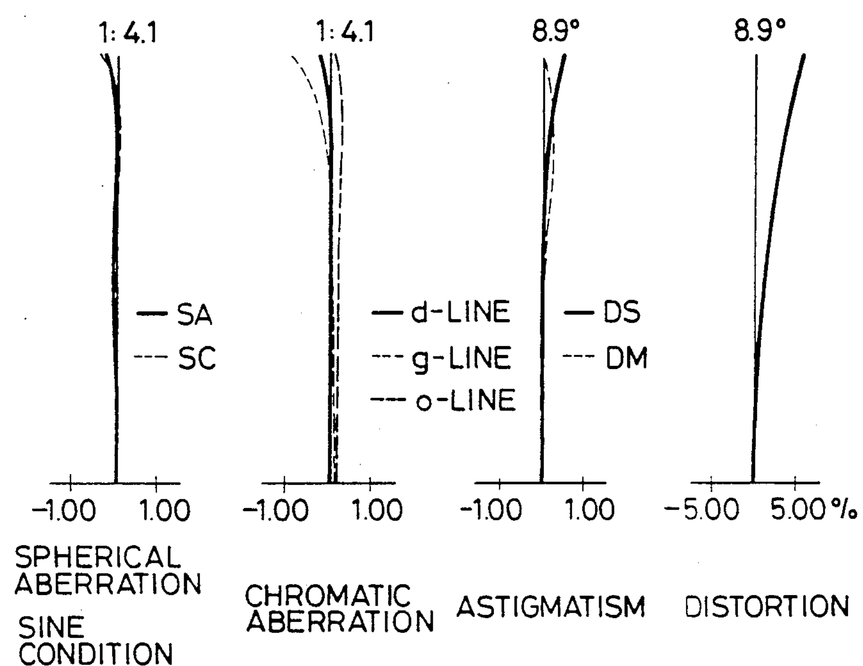
Figure 21:
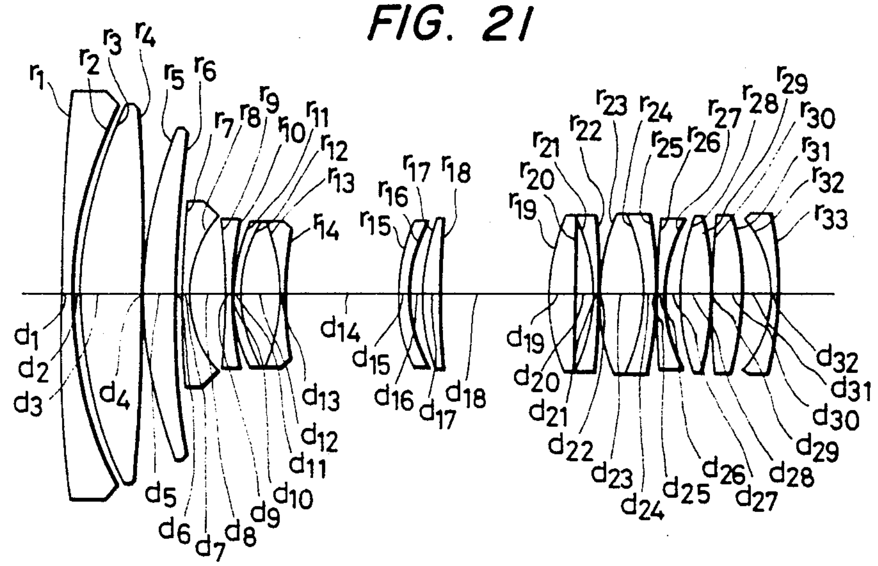
FIG. 21 is a view showing a lens arrangement according to Example 5 of the invention.
Figure 22:
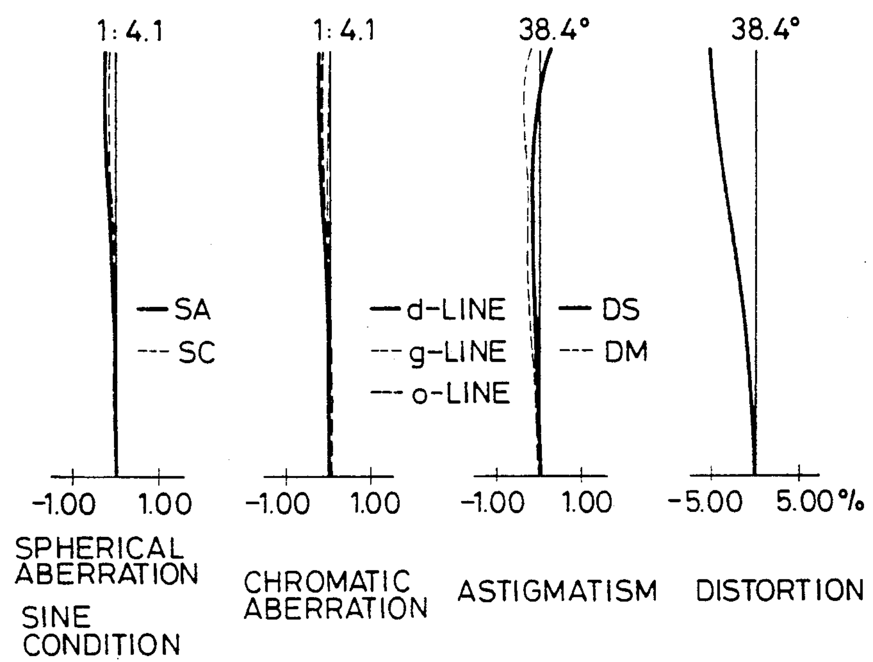
FIGS. 22 through 25 are diagrams showing aberrations of Example 5, FIG. 22 being illustrative of those at a shortest focal length, FIGS. 23 and 24 at first and second intermediate focal lengths, and FIG. 25 at a longest focal length.
Figure 23:
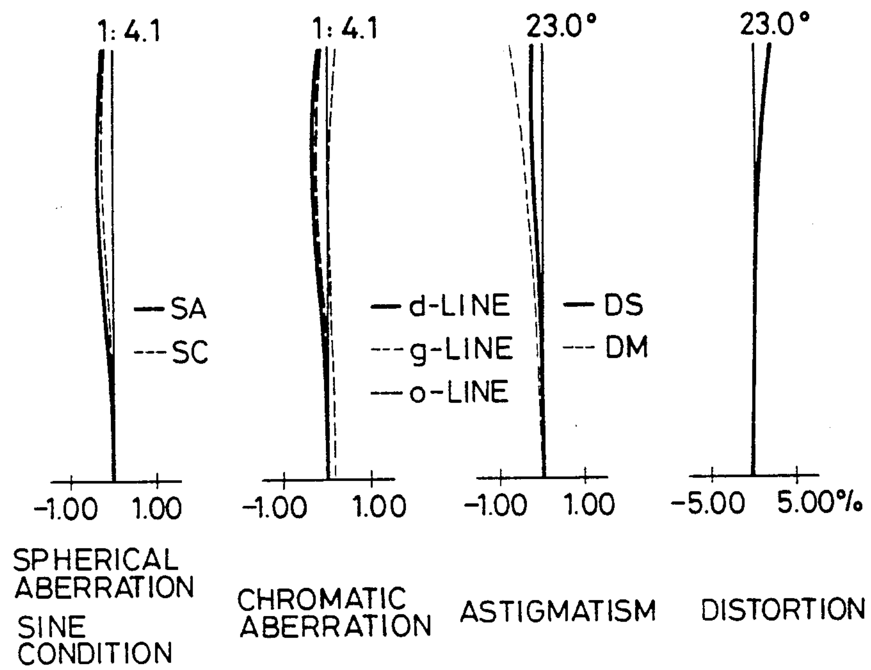
Figure 24:
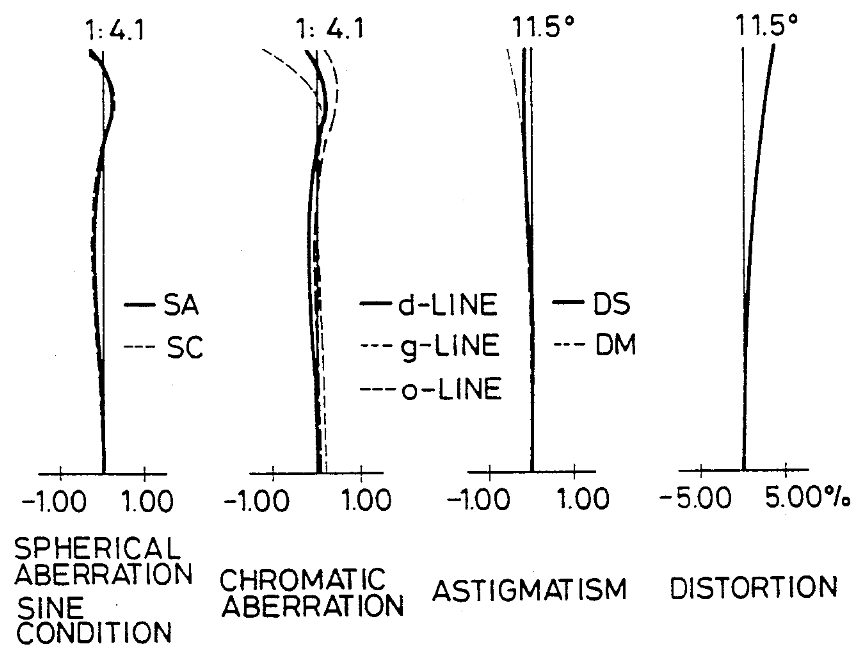
Figure 25:
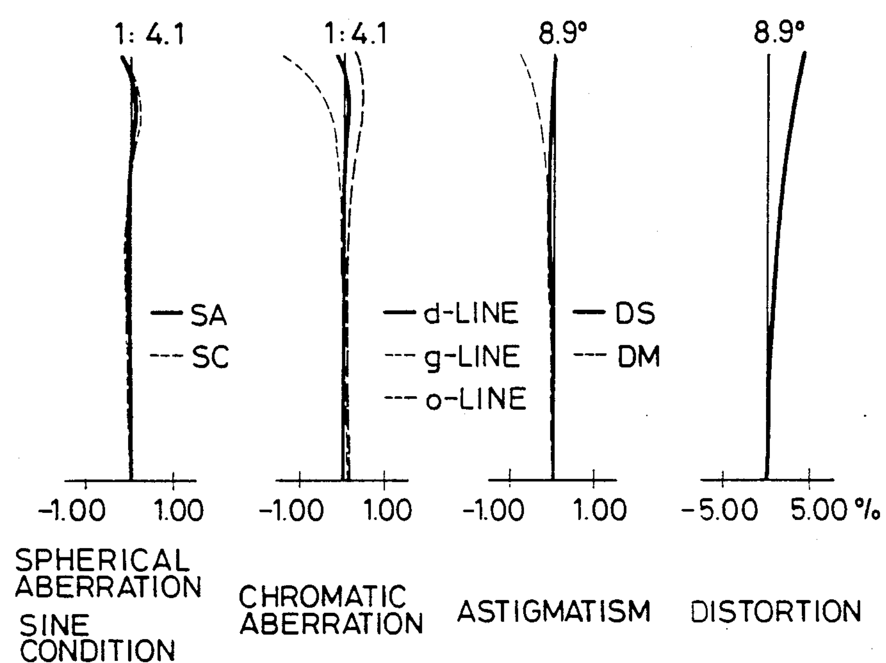

The present invention will hereinafter be described in detail.

According to the present invention, a zoom lens comprises, in order from the object, a first lens group having a positive refractive power, a second lens group having a negative refractive power, a third lens group having a positive refractive power and a fourth lens group having a positive refractive power. The first through fourth lens groups are independently moved in an axial direction to vary the overall focal length. The zoom lens meets the following conditions:

(1) $0.25F_W < F_I < 0.45F_W$ (2) $1.65 < n_{IV}$ (3) $1.2f_{BW} < f_{BT} < 0.95f_{BM}$ where $F_W$ is the overall focal length at the minimum end, $F_I$ is the focal length of the first lens group, $n_{IV}$ is the average refractive index, at d-line, of the lens elements constituting the fourth lens group, $f_{BW}$ and $f_{BT}$ are the backfocuses at the minimum and maximum ends of the overall focal length, respectively, and $f_{BM}$ is the backfocus at 0.78 times the maximum overall focal length.

In the zoom lens according to the invention, the first lens group is composed of a first lens component of a negative meniscus lens, a second lens component of a positive lens and a third lens component of a positive lens, the second lens group is composed of a fourth lens component of a negative lens, a fifth lens component of a negative lens, a sixth lens component of a positive lens and a seventh lens component of a negative lens, the third lens group is composed of an eighth lens component of a negative lens and a ninth lens component of a positive lens, and the fourth lens group is composed of two or more positive lenses of the fourth lens group being located at the frontmost position of the fourth lens group and one of the negative lenses of the fourth lens group being located at the rearmost position of the fourth lens group. The zoom lens further meets the following conditions:

(4) $(n_2+n_3)/2 > 1.75$ (5) $\nu_7 - \nu_6 > 10$ (6) $n_L > 1.8$ where $n_2$ and $n_3$ are the refractive indexes of the second and third lens components at d-line, respectively, $\nu_6$ and $\nu_7$ are the Abbe numbers of the sixth and seventh lens components at d-line, respectively, and $n_L$ is the refractive index, at d-line, of the netative lens located at the rear most position of the fourth lens group.

In embodiments of the invention, the zoom lens meets the following condition:

(7) $1.8 < n_{IVn}$ where $n_{IVn}$ is the average refractive index, at d-line, of the three negative lenses of the fourth lens group.

The condition (1) is related to focusing effected by movement of the front lens group (first lens group) according to the present invention. If the focal length $F_I$ were greater than the upper limit, then the distance which the focusing lens should move would be increased, and the diameter of the front lens would be increased to maintain a sufficient shortest focal length thereof. If the focal length $F_I$ were smaller than the lower limit, then the optical lens would become more compact, but the spherical aberration caused in a telephoto mode would be increased. With existing glass materials, the first lens group would produce increased chromatic aberration in a telephoto mode and could not be corrected easily. More preferably, the condition (1) is further limited to the condition (1'), $0.28F_W < F_I < 0.4F_W$.

The condition (2) is concerned with the average value of the refractive indexes of the lens elements of the first lens group. To keep a highly variable power including a wide-angle capability according to the present invention, the width of a ray of light is increased which passes through the fourth lens group and converges in the vicinity of the center of an image field in medium-telephoto and telephoto modes. It would therefore be extremely difficult to reduce the spherical aberration produced in the fourth lens group. Many highly variable power zoom lenses heretofore available have reduced the F-number of the lens in medium-telephoto to telephoto modes. According to the present invention, the zoom lens retains a sufficient degree of F-number in medium-telephoto and telephoto lenses. To this end, it is important that the spherical aberration produced by the fourth lens group be made as small as possible. If the average refractive index $n_{IV}$ in the condition (2) were smaller than the lower limit, then the radii of curvature of the lens elements of the fourth lens group would be reduced on the average, and the spherical aberration of the fourth lens group would be become greater, with the result that it would be difficult to design a zoom lens having the same degree of F-number in a telephoto mode as that the present invention seeks.

Where a highly variable power zoom lens including a wide-angle capability as according to the present invention is constructed of an optical system with four lens groups movable independently of each other, the lens groups are allowed to move freely in varying their powers. The conditions (3) serves to prescribe the movement of the fourth lens group to improve aberration correction. Unless the fourth lens group were moved to render the backfocus $f_{BT}$ larger than the lower limit in wide-angle to telephoto modes, it would be necessary to increase the power of the second lens group and to increase the number of lenses thereof to maintain the highly variable power that meets the requirements of the invention. If the number of the lens elements of the second lens group were increased, then the diameter of the front lens could not be reduced, resulting in an increase in the cost. Unless the fourth lens group were moved to render the backfocus $f_{BT}$ smaller than the upper limit in medium-telephoto to telephoto modes, the width of a ray of light into the fourth lens group covering in the vicinity of the center of an image field would become too large to maintain the degree of F-number as achieved by the examples of the invention. It would thus be difficult to correct the spherical aberration.

According to the present invention, the zoom lens system satisfying the above described basic conditions (1), (2) and (3) preferably meets the following conditions.

(4) $(n_2+n_3)/2 > 1.75$ (5) $\nu_7 - \nu_6 > 10$ (6) $n_L > 1.8$

The condition (4) relates to the average refractive index of the two positive lenses which constitute a part of the first lens group which is used as a focusing lens group. If the value, $(n_2+n_3)/2$, would be smaller than 1.75, the radii of curvature of the second and third lenses would be rather short under the condition that the focal length of the first lens group be kept at the value defined by the condition (1) in view of the displacement of the first lens group for focusing in order to miniaturize the overall lens system. As a result, faults in performance would tend to be caused. More preferably, the condition (4) is further limited to the condition (4'), $(n_2+n_3)/2>1.77$.

The condition (5) defines a difference in Abbe number between the positive sixth lens and the negative seventh lens which are cemented to each other in the second lens group. If the value, $\nu_7-\nu_6$, would be smaller than 10, it would be difficult to suppress variation in chromatic aberration in the overall lens system of high-zoom-ratio to which the present invention is related.

The condition (6) defines the refractive index of the negative lens located on the final position of the fourth lens group. If the value, $n_L$, would be smaller than 1.8, the radius of curvature thereof would become excessively small so that astigmatism would be remarkable over the entire zoom range and spherical aberration would be remarkable on the telephoto side. More preferably, the condition (6) is further limited to the condition (6'), $n_L>1.85$.

The fourth lens group of the invention is preferably composed of, in order from the object, one or more positive lenses, a single negative lens having a surface of a smaller radius of curvature facing the object, a positive lens component including one or more positive lenses, a single negative lens having a surface of a smaller radius of curvature facing an image, two or more positive lenses, and a single negative lens having a surface of a smaller radius of curvature facing the object.

According to the present invention, it is preferable that the zoom lens system meet the following condition (7) as well as the basic condition (1) to (3).

(7) $1.8<n_{IVn}$ where $n_{IVn}$ is the average refractive index, at d-line, of the three negative lenses of the fourth lens group.

The condition (7) is directed to the average refractive index at d-line of the three negative lenses of the fourth lens group. If the average refractive index $n_{IVn}$ were smaller than the lower limit, then the radii of curvature of these negative lenses would become small, with the consequence that the astigmatism in the full zooming range and the spherical aberration in the telephoto mode would be rendered poor. Therefore, a sufficient degree of F-number in the telephoto mode is achieved by the examples of the invention could not be maintained unless the condition (7) were met. More preferably, the condition (7) is further limited to the condition (7'), $1.82<n_{IVn}$.

Data of examples of the zoom lens according to the present invention will be described. Designated in the tables at F is the focal length, r the radius of curvature of a lens, d a lens thickness or an inter-lens distance, n a refractive index at d-line, and ν the Abbe number of a lens with respect to d-line.

EXAMPLE 1

F = 28.805 – 132.342

| No. | r | d | n | ν |
|---|---|---|---|---|
| 1 | 505.700 | 2.00 | 1.80518 | 25.4 |
| 2 | 69.120 | 1.88 | | |
| 3 | 71.400 | 9.84 | 1.72916 | 54.7 |
| 4 | −444.818 | 0.15 | | |
| 5 | 66.300 | 5.69 | 1.88300 | 40.8 |
| 6 | 175.741 | variable | | |
| 7 | 184.399 | 1.20 | 1.88300 | 40.8 |
| 8 | 18.240 | 5.70 | | |
| 9 | −119.280 | 1.30 | 1.81600 | 46.6 |
| 10 | 57.091 | 0.10 | | |
| 11 | 28.002 | 7.41 | 1.75520 | 27.5 |
| 12 | −28.002 | 1.20 | 1.81600 | 46.6 |
| 13 | 75.000 | variable | | |
| 14 | 26.470 | 2.00 | 1.75520 | 27.5 |
| 15 | 22.339 | 2.00 | | |
| 16 | 33.299 | 3.30 | 1.77250 | 49.7 |
| 17 | 154.400 | variable | | |
| 18 | 31.120 | 4.50 | 1.61800 | 63.4 |
| 19 | −206.849 | 2.22 | | |
| 20 | −32.889 | 1.20 | 1.80518 | 25.4 |
| 21 | −181.168 | 0.20 | | |
| 22 | 32.889 | 9.39 | 1.62041 | 60.3 |
| 23 | −52.500 | 0.30 | | |
| 24 | 260.000 | 1.30 | 1.83481 | 42.7 |
| 25 | 24.157 | 2.30 | | |
| 26 | 35.862 | 4.84 | 1.48749 | 70.1 |
| 27 | −61.411 | 0.20 | | |
| 28 | 104.599 | 5.06 | 1.66680 | 33.0 |
| 29 | −36.800 | 3.21 | | |
| 30 | −19.380 | 1.30 | 1.88300 | 40.8 |
| 31 | −88.200 | | | |

| variable distance | F 28.806 | 50.037 | 103.062 | 132.342 |
|---|---|---|---|---|
| d6 | 1.200 | 15.420 | 34.470 | 44.580 |
| d13 | 18.580 | 11.540 | 5.360 | 3.200 |
| d17 | 17.820 | 10.030 | 2.540 | 0.800 |

$F_I = 0.31F_W$
$n_{IV} = 1.702$
$f_{BT} = 0.91f_{BM} = 1.54f_{BW}$
$(n_2 + n_3)/2 = 1.806$
$\nu_7 - \nu_6 = 19.1$
$n_L = 1.883$
$n_{IVn} = 1.841$

EXAMPLE 2

F = 28.801 – 132.316

| No. | r | d | n | ν |
|---|---|---|---|---|
| 1 | 270.359 | 2.00 | 1.80518 | 25.4 |
| 2 | 66.762 | 1.40 | | |
| 3 | 68.597 | 9.39 | 1.72916 | 54.7 |
| 4 | −1277.450 | 0.15 | | |
| 5 | 66.300 | 6.00 | 1.81600 | 46.6 |
| 6 | 218.700 | variable | | |
| 7 | 242.198 | 1.20 | 1.88300 | 40.8 |
| 8 | 18.768 | 5.70 | | |
| 9 | −117.780 | 1.30 | 1.83481 | 42.7 |
| 10 | 50.845 | 0.10 | | |
| 11 | 28.598 | 7.41 | 1.80518 | 25.4 |
| 12 | −28.598 | 1.20 | 1.88300 | 40.8 |
| 13 | 79.199 | variable | | |
| 14 | 27.300 | 2.00 | 1.80518 | 25.4 |
| 15 | 23.370 | 2.00 | | |
| 16 | 35.000 | 3.30 | 1.77250 | 49.7 |
| 17 | 349.704 | variable | | |
| 18 | 29.989 | 4.50 | 1.61800 | 63.4 |
| 19 | 6450.000 | 2.69 | | |
| 20 | −31.514 | 1.20 | 1.80518 | 25.4 |
| 21 | −226.050 | 0.20 | | |
| 22 | 34.871 | 8.80 | 1.56873 | 63.2 |
| 23 | −54.300 | 0.30 | | |
| 24 | 118.902 | 1.30 | 1.83481 | 42.7 |
| 25 | 25.970 | 2.30 | | |
| 26 | 39.900 | 4.88 | 1.48749 | 70.1 |
| 27 | −59.800 | 0.20 | | |
| 28 | 136.110 | 5.06 | 1.67270 | 32.1 |
| 29 | −37.200 | 4.42 | | |
| 30 | −19.600 | 1.30 | 1.88300 | 40.8 |
| 31 | −65.243 | | | |

| variable distance | F 28.801 | 49.996 | 103.041 | 132.316 |
|---|---|---|---|---|
| d6 | 1.200 | 14.850 | 31.880 | 42.180 |

-continued

| | | | | |
|---|---|---|---|---|
| d13 | 19.210 | 11.910 | 5.270 | 3.200 |
| d17 | 17.820 | 9.580 | 2.420 | 0.800 |

$F_I = 0.32F_W$
$n_{IV} = 1.696$
$f_{BT} = 0.89f_{BM} = 1.58f_{BW}$
$(n_2 + n_3)/2 = 1.773$
$\nu_7 - \nu_6 = 15.4$
$n_L = 1.883$
$n_{IVn} = 1.841$

EXAMPLE 3

F = 28.799 – 132.000

| No. | r | d | n | ν |
|---|---|---|---|---|
| 1 | 442.230 | 2.00 | 1.84666 | 23.9 |
| 2 | 64.265 | 0.66 | | |
| 3 | 67.343 | 8.80 | 1.88300 | 40.8 |
| 4 | 2219.557 | 0.15 | | |
| 5 | 62.922 | 6.30 | 1.81600 | 46.6 |
| 6 | 215.088 | variable | | |
| 7 | 79.830 | 1.60 | 1.88300 | 40.8 |
| 8 | 17.527 | 5.96 | | |
| 9 | −132.071 | 2.00 | 1.83481 | 42.7 |
| 10 | 35.927 | 0.10 | | |
| 11 | 25.661 | 7.41 | 1.71736 | 29.5 |
| 12 | −17.565 | 1.50 | 1.83481 | 42.7 |
| 13 | 134.848 | variable | | |
| 14 | 29.523 | 1.50 | 1.84666 | 23.9 |
| 15 | 27.524 | 2.00 | | |
| 16 | 47.276 | 2.23 | 1.83481 | 42.7 |
| 17 | 464.510 | variable | | |
| 18 | 25.241 | 7.44 | 1.72916 | 54.7 |
| 19 | −59.424 | 1.60 | | |
| 20 | −31.754 | 8.43 | 1.84666 | 23.9 |
| 21 | −14.981 | 1.30 | 1.76180 | 27.1 |
| 22 | 39.641 | 2.20 | | |
| 23 | −181.678 | 3.23 | 1.83481 | 42.7 |
| 24 | −39.108 | 0.20 | | |
| 25 | 47.277 | 10.06 | 1.48749 | 70.1 |
| 26 | −23.660 | 1.00 | | |
| 27 | −18.441 | 1.60 | 1.88300 | 40.8 |
| 28 | −54.267 | | | |

| variable | F | | | |
|---|---|---|---|---|
| distance | 28.799 | 50.000 | 103.000 | 132.000 |
| d6 | 0.804 | 15.060 | 28.638 | 43.895 |
| d13 | 15.195 | 8.750 | 2.795 | 1.999 |
| d17 | 16.603 | 10.798 | 3.736 | 0.800 |

$F_I = 0.31F_W$
$n_{IV} = 1.757$
$f_{BT} = 0.75f_{BM} = 1.43F_{BW}$
$(n_2 + n_3)/2 = 1.806$
$\nu_7 - \nu_6 = 14.6$
$n_L = 1.883$

EXAMPLE 4

F = 28.792 – 131.983

| No. | r | d | n | ν |
|---|---|---|---|---|
| 1 | 257.656 | 2.00 | 1.84666 | 23.9 |
| 2 | 63.576 | 9.10 | 1.72916 | 54.7 |
| 3 | −555.009 | 0.15 | | |
| 4 | 57.585 | 5.80 | 1.88300 | 40.8 |
| 5 | 158.336 | variable | | |
| 6 | 194.661 | 1.20 | 1.88300 | 40.8 |
| 7 | 17.157 | 5.96 | | |
| 8 | −111.536 | 1.30 | 1.88300 | 40.8 |
| 9 | 59.238 | 0.10 | | |
| 10 | 26.088 | 7.41 | 1.78470 | 26.2 |
| 11 | −20.752 | 1.20 | 1.88300 | 40.8 |
| 12 | 66.129 | variable | | |
| 13 | 27.122 | 1.50 | 1.84666 | 23.9 |
| 14 | 24.218 | 2.00 | | |
| 15 | 38.908 | 2.80 | 1.61800 | 63.4 |
| 16 | −278.161 | variable | | |
| 17 | 29.183 | 6.95 | 1.80400 | 46.6 |
| 18 | −72.819 | 1.60 | | |
| 19 | −38.303 | 13.22 | 1.80518 | 25.4 |
| 20 | 38.079 | 2.20 | | |
| 21 | 137.720 | 3.23 | 1.48749 | 70.1 |
| 22 | −35.268 | 0.20 | | |
| 23 | 80.076 | 5.80 | 1.60342 | 38.0 |
| 24 | −23.995 | 2.46 | | |
| 25 | −19.152 | 1.30 | 1.88300 | 40.8 |
| 26 | −60.514 | | | |

| variable | F | | | |
|---|---|---|---|---|
| distance | 28.792 | 49.991 | 102.978 | 131.983 |
| d5 | 1.197 | 14.609 | 28.195 | 36.892 |
| d12 | 17.381 | 11.386 | 5.101 | 3.197 |
| d16 | 17.059 | 10.276 | 3.007 | 0.794 |

$F_I = 0.37F_W$
$n_{IV} = 1.717$
$f_{BT} = 0.85f_{BM} = 1.40f_{BW}$
$(n_2 + n_3)/2 = 1.806$
$\nu_7 - \nu_6 = 14.6$
$n_L = 1.883$

EXAMPLE 5

F = 28.820 – 132.448

| No. | r | d | n | ν |
|---|---|---|---|---|
| 1 | 377.370 | 2.00 | 1.80518 | 25.4 |
| 2 | 69.147 | 1.20 | | |
| 3 | 70.160 | 9.77 | 1.72916 | 54.7 |
| 4 | −533.185 | 0.15 | | |
| 5 | 69.120 | 5.39 | 1.88300 | 40.8 |
| 6 | 178.352 | variable | | |
| 7 | 183.798 | 1.20 | 1.88300 | 40.8 |
| 8 | 18.372 | 5.70 | | |
| 9 | −116.421 | 1.30 | 1.83481 | 42.7 |
| 10 | 57.600 | 0.10 | | |
| 11 | 27.915 | 1.00 | 1.80440 | 39.6 |
| 12 | 21.000 | 6.61 | 1.75520 | 27.5 |
| 13 | −29.210 | 1.00 | 1.81554 | 44.4 |
| 14 | 76.700 | variable | | |
| 15 | 26.946 | 2.00 | 1.75520 | 27.5 |
| 16 | 22.606 | 2.00 | | |
| 17 | 33.306 | 3.30 | 1.77250 | 49.6 |
| 18 | 173.952 | variable | | |
| 19 | 31.800 | 4.50 | 1.61800 | 63.4 |
| 20 | −289.338 | 2.36 | | |
| 21 | −32.000 | 1.20 | 1.80518 | 25.4 |
| 22 | −195.000 | 0.20 | | |
| 23 | 34.040 | 7.12 | 1.67000 | 57.4 |
| 24 | −30.134 | 2.00 | 1.56873 | 63.1 |
| 25 | −96.900 | 0.30 | | |
| 26 | 165.100 | 1.30 | 1.88300 | 40.8 |
| 27 | 25.064 | 2.30 | | |
| 28 | 37.980 | 5.08 | 1.48749 | 70.1 |
| 29 | −51.300 | 0.20 | | |
| 30 | 193.485 | 5.06 | 1.66680 | 33.0 |
| 31 | −36.395 | 4.32 | | |
| 32 | −19.080 | 1.30 | 1.88300 | 40.8 |
| 33 | −56.405 | | | |

| variable | F | | | |
|---|---|---|---|---|
| distance | 28.820 | 50.020 | 103.075 | 132.448 |
| d6 | 1.187 | 13.367 | 35.417 | 44.753 |
| d14 | 18.624 | 11.032 | 5.300 | 3.207 |
| d18 | 17.831 | 9.590 | 2.630 | 0.781 |

$F_I = 0.30F_W$
$n_{IV} = 1.698$
$f_{BT} = 0.94f_{BM} = 1.59f_{BW}$
$n_{IVn} = 1.857$

What is claimed is:

1. A zoom lens comprising, in order from the object, a first lens group having a positive refractive power, a second lens group having a negative refractive power, a third lens group having a positive refractive power and a fourth lens group having a positive refractive power, said first through fourth lens group being independently moved in an axial direction to vary the overall focal length, said zoom lens meeting the following conditions:

(1) $0.25F_W<F_I<0.45F_W$, (2) $1.65<n_{IV}$, and (3) $1.2f_{BW}<f_{BT}<0.95f_{BM}$ where $F_W$ is the overall focal length at the minimum end, $F_I$ is the focal length of the first lens group, $n_{IV}$ is the average refractive index, at d-line, of the lens elements constituting the fourth lens group, $f_{BW}$ and $f_{BT}$ are the backfocuses at the minimum and maximum ends of the overall focal length, respectively, $f_{BM}$ is the backfocus at an intermediate value of said overall focal length between said minimum and maximum ends.

2. The zoom lens according to claim 1, wherein said first lens group is composed of a first lens component of a negative meniscus lens, a second lens component of a positive lens and a third component of a positive lens, said second lens group is composed of a fourth lens component of a negative lens, a fifth lens component of a negative lens, a sixth lens component of a positive lens and a seventh lens component of a negative lens, said third lens group is composed of an eighth lens component of a negative lens and a ninth lens component of a positive lens, and said fourth lens group is composed of at least two positive lenses and at least two negative lenses, one of the positive lenses of the fourth lens group being located at the frontmost position of the fourth lens group and one of the negative lenses of the fourth lens group being located at the rearmost position of the fourth lens group, the zoom lens further meeting the following conditions:

(4) $(n_2+n_3)/2>1.75$, (5) $\nu_7-\nu_6>10$, and (6) $n_L>1.8$ where $n_2$ and $n_3$ are the refractive indexes of said second and third lens components at d-line, respectively, $\nu_6$ and $\nu_7$ are the Abbe numbers of said sixth and seventh lens components at d-line, respectively, and $n_L$ is the refractive index, at d-line, of the negative lens located at the rearmost position of the fourth lens group.

3. The zoom lens according to claim 1, wherein said fourth lens group is composed of, in order from the object, at least one positive lens, a single negative lens having a surface of a smaller radius of curvature facing the object, a positive len component including at least one positive lens, a single negative lens having a surface of a smaller radius of curvature facing an image, at least two positive lenses, and a single negative lens having a surface of a smaller radius of curvature facing the object, said zoom lens meeting the following condition:

(7) $1.8<n_{IVn}$ where $n_{IVn}$ is the average refractive index, at d-line, of the three negative lenses of the fourth lens group.

4. The zoom lens according to claim 2, meeting the following conditions:

(1') $0.28F_W<F_I<0.4F_W$, (4') $(n_2+n_3)/2>1.77$, and (6') $n_L>1.85$.

5. The zoom lens according to claim 3, meeting the following conditions:

(1') $0.28F_W<F_I<0.4F_W$, and (7') $1.82<n_{IVn}$.

6. The zoom lens according to claim 5 further meeting the following chart:

| No. | F = 28.805 – 132.342<br>r | d | n | ν |
|---|---|---|---|---|
| 1 | 505.700 | 2.00 | 1.80518 | 25.4 |
| 2 | 69.120 | 1.88 | | |
| 3 | 71.400 | 9.84 | 1.72916 | 54.7 |
| 4 | −444.818 | 0.15 | | |
| 5 | 66.300 | 5.69 | 1.88300 | 40.8 |
| 6 | 175.741 | variable | | |
| 7 | 184.399 | 1.20 | 1.88300 | 40.8 |
| 8 | 18.240 | 5.70 | | |
| 9 | −119.280 | 1.30 | 1.81600 | 46.6 |
| 10 | 57.091 | 0.10 | | |
| 11 | 28.002 | 7.41 | 1.75520 | 27.5 |
| 12 | −28.002 | 1.20 | 1.81600 | 46.6 |
| 13 | 75.000 | variable | | |
| 14 | 26.470 | 2.00 | 1.75520 | 27.5 |
| 15 | 22.339 | 2.00 | | |
| 16 | 33.299 | 3.30 | 1.77250 | 49.7 |
| 17 | 154.400 | variable | | |
| 18 | 31.120 | 4.50 | 1.61800 | 63.4 |
| 19 | −206.849 | 2.22 | | |
| 20 | −32.889 | 1.20 | 1.80518 | 25.4 |
| 21 | −181.168 | 0.20 | | |
| 22 | 32.889 | 9.39 | 1.62041 | 60.3 |
| 23 | −52.500 | 0.30 | | |
| 24 | 260.000 | 1.30 | 1.83481 | 42.7 |
| 25 | 24.157 | 2.30 | | |
| 26 | 35.862 | 4.84 | 1.48749 | 70.1 |
| 27 | −61.411 | 0.20 | | |
| 28 | 104.599 | 5.06 | 1.66680 | 33.0 |
| 29 | −36.800 | 3.21 | | |
| 30 | −19.380 | 1.30 | 1.88300 | 40.8 |
| 31 | −88.200 | | | |

| variable distance | F<br>28.806 | 50.037 | 103.062 — | 132.342 |
|---|---|---|---|---|
| d6 | 1.200 | 15.420 | 34.470 | 44.580 |
| d13 | 18.580 | 11.540 | 5.360 | 3.200 |
| d17 | 17.820 | 10.030 | 2.540 | 0.800 |

$F_I = 0.31F_W$
$n_{IV} = 1.702$
$f_{BT} = 0.91f_{BM} = 1.54f_{BW}$
$(n_2 + n_3)/2 = 1.806$
$\nu_7 - \nu_6 = 19.1$
$n_L = 1.883$
$n_{IVn} = 1.841$

7. The zoom lens according to claim 5, further meeting the following chart:

| No. | F = 28.801 – 132.316<br>r | d | n | ν |
|---|---|---|---|---|
| 1 | 270.359 | 2.00 | 1.80518 | 25.4 |
| 2 | 66.762 | 1.40 | | |
| 3 | 68.597 | 9.39 | 1.72916 | 54.7 |
| 4 | −1277.450 | 0.15 | | |
| 5 | 66.300 | 6.00 | 1.81600 | 46.6 |
| 6 | 218.700 | variable | | |
| 7 | 242.198 | 1.20 | 1.88300 | 40.8 |
| 8 | 18.768 | 5.70 | | |
| 9 | −117.780 | 1.30 | 1.83481 | 42.7 |
| 10 | 50.845 | 0.10 | | |
| 11 | 28.598 | 7.41 | 1.80518 | 25.4 |
| 12 | −28.598 | 1.20 | 1.88300 | 40.8 |
| 13 | 79.199 | variable | | |
| 14 | 27.300 | 2.00 | 1 80518 | 25.4 |
| 15 | 23.370 | 2.00 | | |
| 16 | 35.000 | 3.30 | 1.77250 | 49.7 |
| 17 | 349.704 | variable | | |

-continued

| | | | | |
|---|---|---|---|---|
| 18 | 29.989 | 4.50 | 1.61800 | 63.4 |
| 19 | 6450.000 | 2.69 | | |
| 20 | −31.514 | 1.20 | 1.80518 | 25.4 |
| 21 | −226.050 | 0.20 | | |
| 22 | 34.871 | 8.80 | 1.56873 | 63.2 |
| 23 | −54.300 | 0.30 | | |
| 24 | 118.902 | 1.30 | 1.83481 | 42.7 |
| 25 | 25.970 | 2.30 | | |
| 26 | 39.900 | 4.88 | 1.48749 | 70.1 |
| 27 | −59.800 | 0.20 | | |
| 28 | 136.110 | 5.06 | 1.67270 | 32.1 |
| 29 | −37.200 | 4.42 | | |
| 30 | −19.600 | 1.30 | 1.88300 | 40.8 |
| 31 | −65.243 | | | |

| variable | F | | | |
|---|---|---|---|---|
| distance | 28.801 | 49.996 | 103.041 | 132.316 |
| d6 | 1.200 | 14.850 | 31.880 | 42.180 |
| d13 | 19.210 | 11.910 | 5.270 | 3.200 |
| d17 | 17.820 | 9.580 | 2.420 | 0.800 |

$F_I = 0.32F_W$
$n_{IV} = 1.696$
$f_{BT} = 0.89f_{BM} = 1.58f_{BW}$
$(n_2 + n_3)/2 = 1.773$
$\nu_7 - \nu_6 = 15.4$
$n_L = 1.883$
$n_{IVn} = 1.841$

8. The zoom lens according to claim 4 further meeting the following chart:

F = 28.799 − 132.000

| No. | r | d | n | ν |
|---|---|---|---|---|
| 1 | −442.230 | 2.00 | 1.84666 | 23.9 |
| 2 | 64.265 | 0.66 | | |
| 3 | 67.343 | 8.80 | 1.88300 | 40.8 |
| 4 | 2219.557 | 0.15 | | |
| 5 | 62.922 | 6.30 | 1.81600 | 46.6 |
| 6 | 215.088 | variable | | |
| 7 | 79.830 | 1.60 | 1.88300 | 40.8 |
| 8 | 17.527 | 5.96 | | |
| 9 | −132.071 | 2.00 | 1.83481 | 42.7 |
| 10 | 35.927 | 0.10 | | |
| 11 | 25.661 | 7.41 | 1.71736 | 29.5 |
| 12 | −17.565 | 1.50 | 1.83481 | 42.7 |
| 13 | 134.848 | variable | | |
| 14 | 29.523 | 1.50 | 1.84666 | 23.9 |
| 15 | 27.524 | 2.00 | | |
| 16 | 47.276 | 2.23 | 1.83481 | 42.7 |
| 17 | 464.510 | variable | | |
| 18 | 25.241 | 7.44 | 1.72916 | 54.7 |
| 19 | −59.424 | 1.60 | | |
| 20 | −31.754 | 8.43 | 1.84666 | 23.9 |
| 21 | −14.981 | 1.30 | 1.76180 | 27.1 |
| 22 | 39.641 | 2.20 | | |
| 23 | −181.678 | 3.23 | 1.83481 | 42.7 |
| 24 | −39.108 | 0.20 | | |
| 25 | 47.277 | 10.06 | 1.48749 | 70.1 |
| 26 | −23.660 | 1.00 | | |
| 27 | −18.441 | 1.60 | 1.88300 | 40.8 |
| 28 | −54.267 | | | |

| variable | F | | | |
|---|---|---|---|---|
| distance | 28.799 | 50.000 | 103.000 | 132.000 |
| d6 | 0.804 | 15.060 | 28.638 | 43.895 |
| d13 | 15.195 | 8.750 | 2.795 | 1.999 |
| d17 | 16.603 | 10.798 | 3.736 | 0.800 |

$F_I = 0.31F_W$
$n_{IV} = 1.757$
$f_{BT} = 0.75f_{BM} = 1.43f_{BW}$
$(n_2 + n_3)/2 = 1.806$
$\nu_7 - \nu_6 = 14.6$
$n_L = 1.883$

9. The zoom lens according to claim 4 further meeting the following chart:

F = 28.792 − 131.983

| No. | r | d | n | ν |
|---|---|---|---|---|
| 1 | 257.656 | 2.00 | 1.84666 | 23.9 |
| 2 | 63.576 | 9.10 | 1.72916 | 54.7 |
| 3 | −555.009 | 0.15 | | |
| 4 | 57.585 | 5.80 | 1.88300 | 40.8 |
| 5 | 158.336 | variable | | |
| 6 | 194.661 | 1.20 | 1.88300 | 40.8 |
| 7 | 17.157 | 5.96 | | |
| 8 | −111.536 | 1.30 | 1.88300 | 40.8 |
| 9 | 59.238 | 0.10 | | |
| 10 | 26.088 | 7.41 | 1.78470 | 26.2 |
| 11 | −20.752 | 1.20 | 1.88300 | 40.8 |
| 12 | 66.129 | variable | | |
| 13 | 27.122 | 1.50 | 1.84666 | 23.9 |
| 14 | 24.218 | 2.00 | | |
| 15 | 38.908 | 2.80 | 1.61800 | 63.4 |
| 16 | −278.161 | variable | | |
| 17 | 29.183 | 6.95 | 1.80400 | 46.6 |
| 18 | −72.819 | 1.60 | | |
| 19 | −38.303 | 13.22 | 1.80518 | 25.4 |
| 20 | 38.079 | 2.20 | | |
| 21 | 137.720 | 3.23 | 1.48749 | 70.1 |
| 22 | −35.268 | 0.20 | | |
| 23 | 80.076 | 5.80 | 1.60342 | 38.0 |
| 24 | −23.995 | 2.46 | | |
| 25 | −19.152 | 1.30 | 1.88300 | 40.8 |
| 26 | −60.514 | | | |

| variable | F | | | |
|---|---|---|---|---|
| distance | 28.792 | 49.991 | 102.978 | 131.983 |
| d5 | 1.197 | 14.609 | 28.195 | 36.892 |
| d12 | 17.381 | 11.386 | 5.101 | 3.197 |
| d16 | 17.059 | 10.276 | 3.007 | 0.794 |

$F_I = 0.37F_W$
$n_{IV} = 1.717$
$f_{BT} = 0.85f_{BM} = 1.40f_{BW}$
$(n_2 + n_3)/2 = 1.806$
$\nu_7 - \nu_6 = 14.6$
$n_L = 1.883$

10. The zoom lens according to claim 5 further meeting the following chart:

F = 28.820 − 132.448

| No. | r | d | n | ν |
|---|---|---|---|---|
| 1 | 377.370 | 2.00 | 1.80518 | 25.4 |
| 2 | 69.147 | 1.20 | | |
| 3 | 70.160 | 9.77 | 1.72916 | 54.7 |
| 4 | −533.185 | 0.15 | | |
| 5 | 69.120 | 5.39 | 1.88300 | 40.8 |
| 6 | 178.352 | variable | | |
| 7 | 183.798 | 1.20 | 1.88300 | 40.8 |
| 8 | 18.372 | 5.70 | | |
| 9 | −116.421 | 1.30 | 1.83481 | 42.7 |
| 10 | 57.600 | 0.10 | | |
| 11 | 27.915 | 1.00 | 1.80440 | 39.6 |
| 12 | 21.000 | 6.61 | 1.75520 | 27.5 |
| 13 | −29.210 | 1.00 | 1.81554 | 44.4 |
| 14 | 76.700 | variable | | |
| 15 | 26.946 | 2.00 | 1.75520 | 27.5 |
| 16 | 22.606 | 2.00 | | |
| 17 | 33.306 | 3.30 | 1.75520 | 49.6 |
| 18 | 173.952 | variable | | |
| 19 | 31.800 | 4.50 | 1.61800 | 63.4 |
| 20 | −289.338 | 2.36 | | |
| 21 | −32.000 | 1.20 | 1.80518 | 25.4 |
| 22 | −195.000 | 0.20 | | |
| 23 | 34.040 | 7.12 | 1.67000 | 57.4 |
| 24 | −30.134 | 2.00 | 1.56873 | 63.1 |
| 25 | −96.900 | 0.30 | | |
| 26 | 165.100 | 1.30 | 1.88300 | 40.8 |
| 27 | 25.064 | 2.30 | | |
| 28 | 37.980 | 5.08 | 1.48749 | 70.1 |
| 29 | −51.300 | 0.20 | | |
| 30 | 193.485 | 5.06 | 1.66680 | 33.0 |
| 31 | −36.395 | 4.32 | | |

-continued

| 32 | −19.080 | 1.30 | 1.88300 | 40.8 |
|---|---|---|---|---|
| 33 | −56.405 | | | |

| variable | F | | | |
|---|---|---|---|---|
| distance | 28.820 | 50.020 | 103.075 | 132.448 |
| d6 | 1.187 | 13.367 | 35.417 | 44.753 |
| d14 | 18.624 | 11.032 | 5.300 | 3.207 |

-continued

| d18 | 17.831 | 9.590 | 2.630 | 0.781 |
|---|---|---|---|---|

$F_I = 0.30F_W$
$n_{IV} = 1.698$
$f_{BT} = 0.94f_{BM} = 1.59f_{BW}$
$n_{IVn} = 1.857$

11. The zoom lens according to claim 1, wherein $f_{BM}$ is the backfocus at 0.78 times the maximum overall focal lenth.

* * * * *